United States Patent
Al Jurdi et al.

(10) Patent No.: US 12,219,490 B2
(45) Date of Patent: Feb. 4, 2025

(54) POWER SAVING FOR IN-DEVICE COEXISTENCE BETWEEN WI-FI AND ULTRA-WIDE BAND COMMUNICATION

(71) Applicant: Samsung Electronics Co., Ltd., Suwon-si (KR)

(72) Inventors: Rebal Al Jurdi, Allen, TX (US); Hao Chen, Plano, TX (US); Khuong N. Nguyen, Frisco, TX (US); Abhishek Sehgal, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 17/840,324

(22) Filed: Jun. 14, 2022

(65) Prior Publication Data
US 2022/0417856 A1 Dec. 29, 2022

Related U.S. Application Data

(60) Provisional application No. 63/215,265, filed on Jun. 25, 2021.

(51) Int. Cl.
*H04W 52/02* (2009.01)
*H04B 1/7163* (2011.01)

(52) U.S. Cl.
CPC ...... *H04W 52/0235* (2013.01); *H04B 1/7163* (2013.01); *H04W 52/0258* (2013.01)

(58) Field of Classification Search
CPC .......... H04W 52/0235; H04W 52/0258; H04B 1/7163; H04B 2201/71634; H04B 1/719; Y02D 30/70
See application file for complete search history.

(56) References Cited

U.S. PATENT DOCUMENTS

| | | | |
|---|---|---|---|
| 9,191,891 B2 | 11/2015 | Jafarian et al. | |
| 9,572,105 B2 | 2/2017 | Wong et al. | |
| 2011/0069650 A1* | 3/2011 | Singh | H04W 52/0216 370/311 |
| 2022/0007333 A1 | 1/2022 | Lee et al. | |
| 2022/0295483 A1* | 9/2022 | Jain | H04W 4/029 |

FOREIGN PATENT DOCUMENTS

KR   1020210117580 A   9/2021

OTHER PUBLICATIONS

Chen et al., "Scheduling Channel Access Based on Target Wake Time Mechanism in 802.11ax WLANs," in IEEE Transactions on Wireless Communications, vol. 20, No. 3, pp. 1529-1543, Mar. 2021 (Year: 2021).*

* cited by examiner

*Primary Examiner* — Sam K Ahn
*Assistant Examiner* — Amneet Singh

(57) ABSTRACT

A method includes determining one or more active slots and inactive slots in an ultra-wide band (UWB) ranging round. The method also includes determining multiple UWB silent periods in the ranging round based on an arrangement of the inactive slots. The method also includes determining a sleep-wake-up schedule that aligns with at least one selected silent period of the multiple UWB silent periods in the ranging round, the sleep-wake-up schedule to be used for Wi-Fi communication. The method also includes waking up a Wi-Fi station (STA) for the Wi-Fi communication during the at least one selected silent period, then going back to sleep according to the sleep-wake-up schedule.

18 Claims, 12 Drawing Sheets

POWER SAVING FOR IN-DEVICE COEXISTENCE BETWEEN WI-FI AND ULTRA-WIDE BAND COMMUNICATION

CROSS-REFERENCE TO RELATED APPLICATIONS AND CLAIM OF PRIORITY

The present application claims priority to U.S. Provisional Patent Application Ser. No. 63/215,265, filed on Jun. 25, 2021. The content of the above-identified patent document is incorporated herein by reference.

TECHNICAL FIELD

The present disclosure relates generally to wireless communication systems and, more specifically, the present disclosure relates to a power saving for in-device coexistence between Wi-Fi and ultra-wide band communication.

BACKGROUND

Ultra-Wide Band (UWB) is a wireless technology recently added to mobile devices that enables not only data-sharing applications, but also many other use cases such as indoor positioning and navigation. Recently, the Wi-Fi Alliance has started granting Wi-Fi 6 certification to devices implementing the IEEE 802.11ax amendment, which enhances throughput and efficiency in congested environments, and device vendors have been rapidly seeking this certification. The certification program extends to devices capable of operating in the 6 GHz band for bandwidth-intensive applications via the Wi-Fi 6E certification. With some UWB channels spanning the 6 GHz band, which is also used by Wi-Fi-6E-certified devices, the two systems, Wi-Fi and UWB, are at risk of interference from one another.

SUMMARY

The present disclosure relates to power saving for in-device coexistence between Wi-Fi and ultra-wide band communication.

In one embodiment, a method includes determining one or more active slots and inactive slots in an ultra-wide band (UWB) ranging round. The method also includes determining multiple UWB silent periods in the ranging round based on an arrangement of the inactive slots. The method also includes determining a sleep-wake-up schedule that aligns with at least one selected silent period of the multiple UWB silent periods in the ranging round, the sleep-wake-up schedule to be used for Wi-Fi communication. The method also includes waking up a Wi-Fi station (STA) for the Wi-Fi communication during the at least one selected silent period, then going back to sleep according to the sleep-wake-up schedule.

In another embodiment, a device includes a memory configured to store instructions. The device also includes a processor operably connected to the memory. The processor is configured when executing the instructions to: determine one or more active slots and inactive slots in an UWB ranging round; determine multiple UWB silent periods in the ranging round based on an arrangement of the inactive slots; determine a sleep-wake-up schedule that aligns with at least one selected silent period of the multiple UWB silent periods in the ranging round, the sleep-wake-up schedule to be used for Wi-Fi communication; and control the device to wake up for the Wi-Fi communication during the at least one selected silent period, then go back to sleep according to the sleep-wake-up schedule.

In yet another embodiment, a non-transitory computer readable medium includes a plurality of instructions. The plurality of instructions, when executed by at least one processor, is configured to cause the at least one processor to: determine one or more active slots and inactive slots in an UWB ranging round; determine multiple UWB silent periods in the ranging round based on an arrangement of the inactive slots; determine a sleep-wake-up schedule that aligns with at least one selected silent period of the multiple UWB silent periods in the ranging round, the sleep-wake-up schedule to be used for Wi-Fi communication; and control a STA to wake up for the Wi-Fi communication during the at least one selected silent period, then go back to sleep according to the sleep-wake-up schedule.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another, or can operate as standalone schemes.

Figure 1:
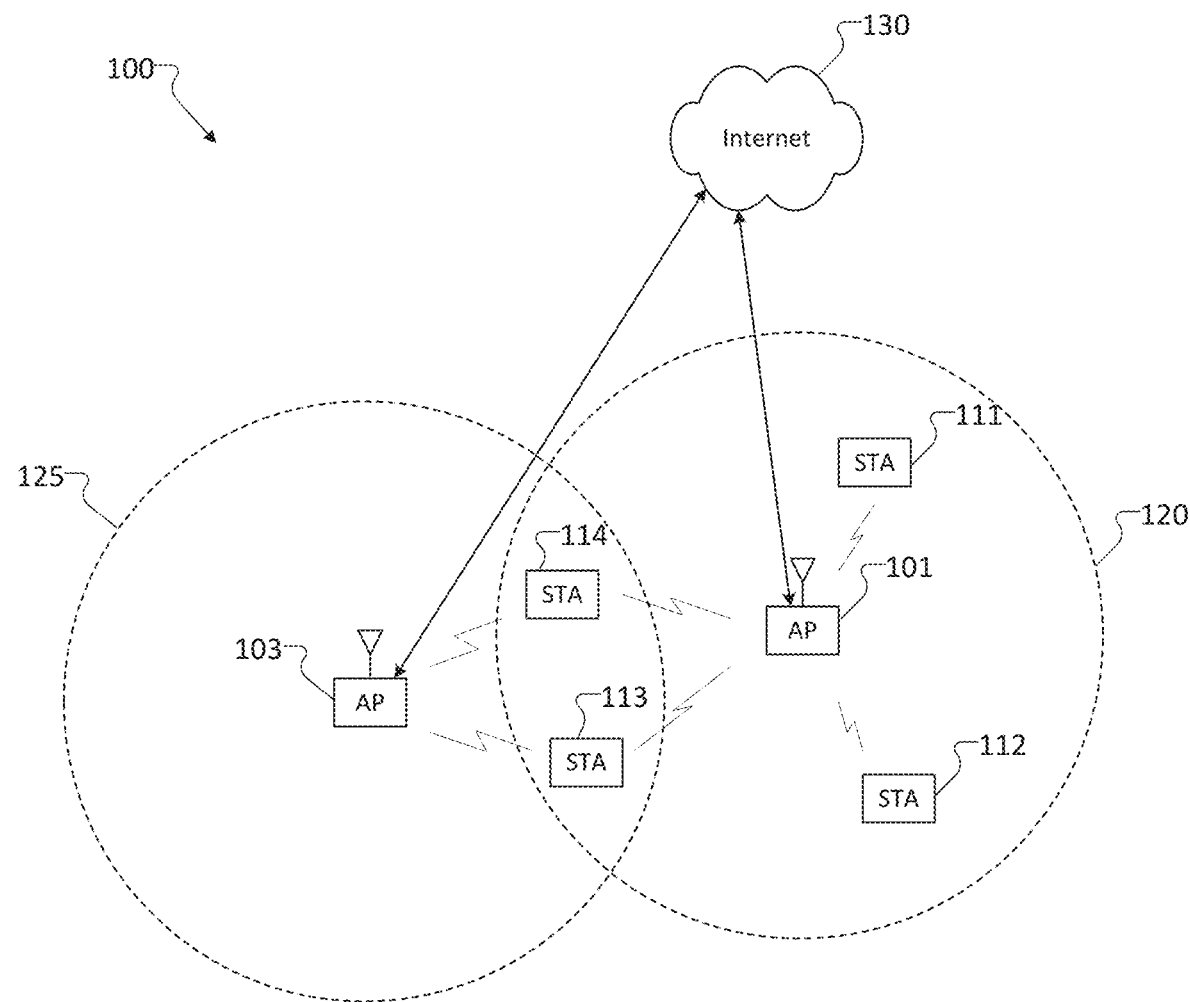
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for power saving for in-device coexistence between Wi-Fi and ultra-wide band communication. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of TAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
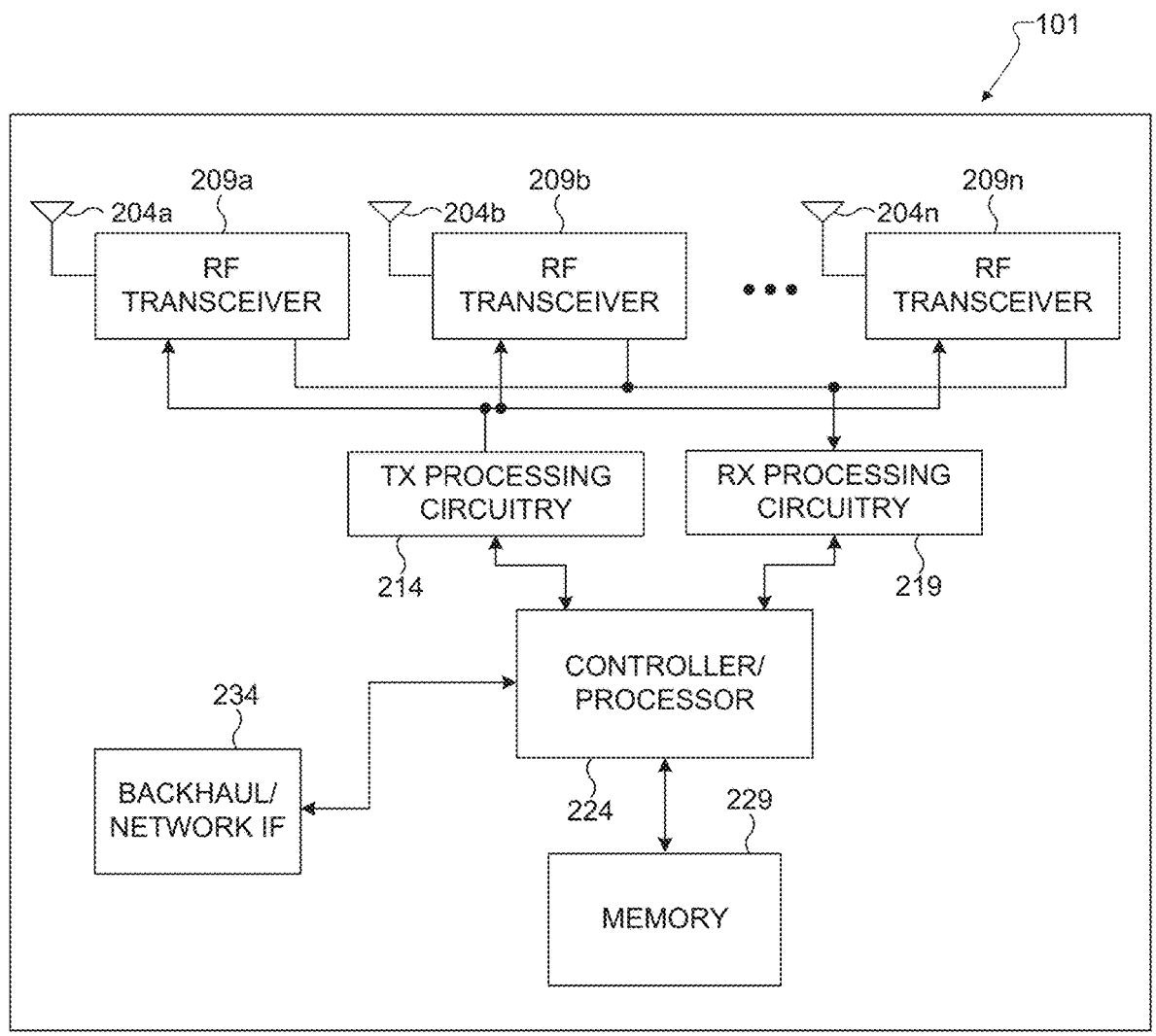
FIG. 2A illustrates an example AP according to embodiments of the present disclosure.

FIG. 2A illustrates an example AP 101 according to embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of uplink channel signals and the transmission of downlink channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including power saving for in-device coexistence between Wi-Fi and ultra-wide band communication. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for power saving for in-device coexistence between Wi-Fi and ultra-wide band communication. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
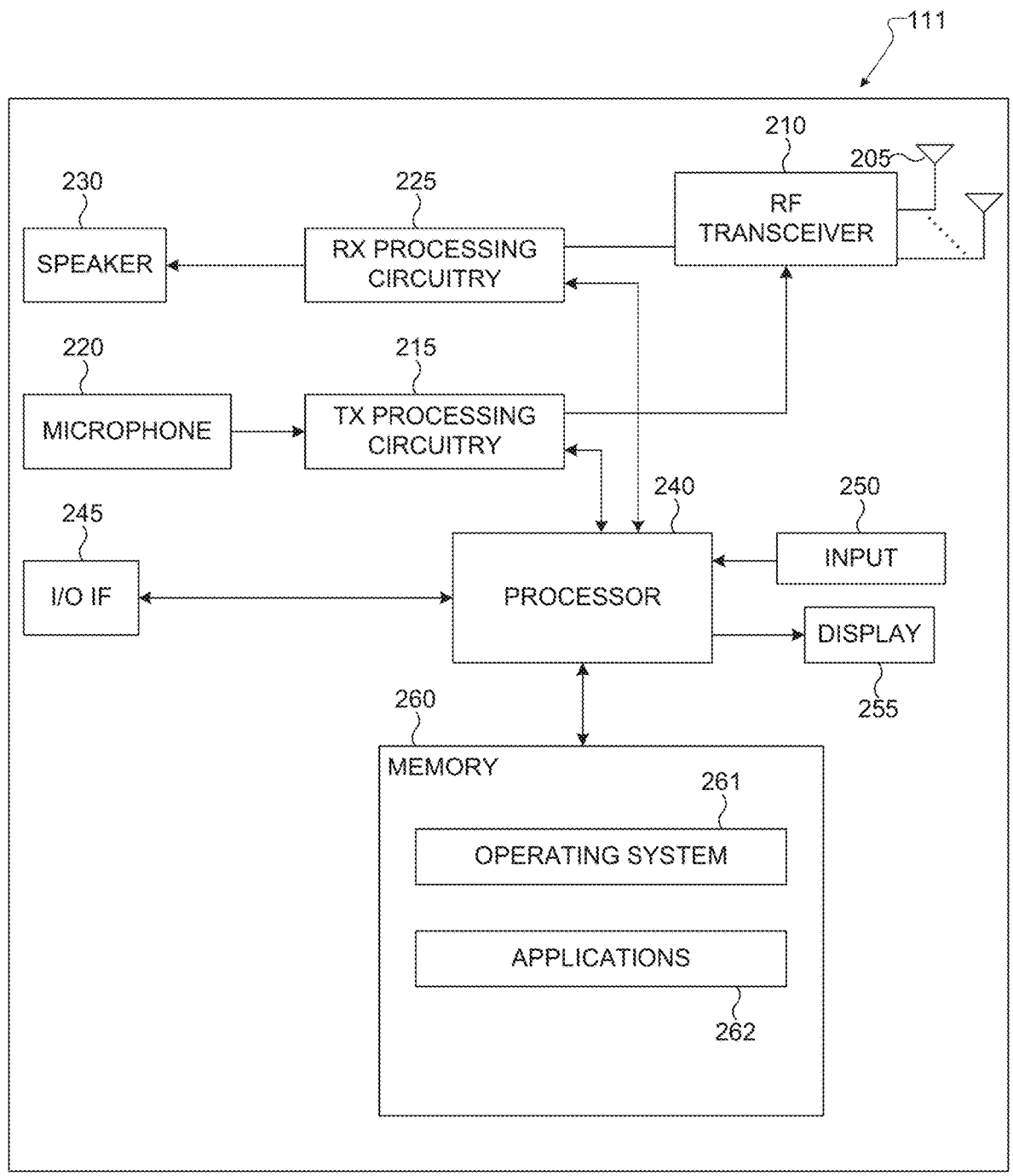
FIG. 2B illustrates an example STA according to embodiments of this disclosure.

FIG. 2B illustrates an example STA 111 according to embodiments of this disclosure. The embodiment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of downlink channel signals and the transmission of uplink channel signals by the RF transceiver 210, the RX processing circuitry 225, and the TX processing circuitry 215 in accordance with well-known principles. The main controller/processor 240 can also include processing circuitry configured for power saving for in-device coexistence between Wi-Fi and ultra-wide band communication. In some embodiments, the controller/processor 240 includes at least one microprocessor or microcontroller.

The controller/processor 240 can move data into or out of the memory 260 as required by an executing process. In some embodiments, the controller/processor 240 is configured to execute a plurality of applications 262, such as applications for power saving for in-device coexistence between Wi-Fi and ultra-wide band communication. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

UWB is a wireless technology that enables positioning and proximity applications. Specifically, the 802.15.4z amendment to the IEEE Standard for Low-Rate Wireless Networks defines UWB ranging techniques and ranging modes of operation that standardize the computation and communication of key physical quantities, such as round-trip time between two ranging capable devices (RDEVs), time of flight, and two- or three-dimensional angle of arrival.

Figure 3:
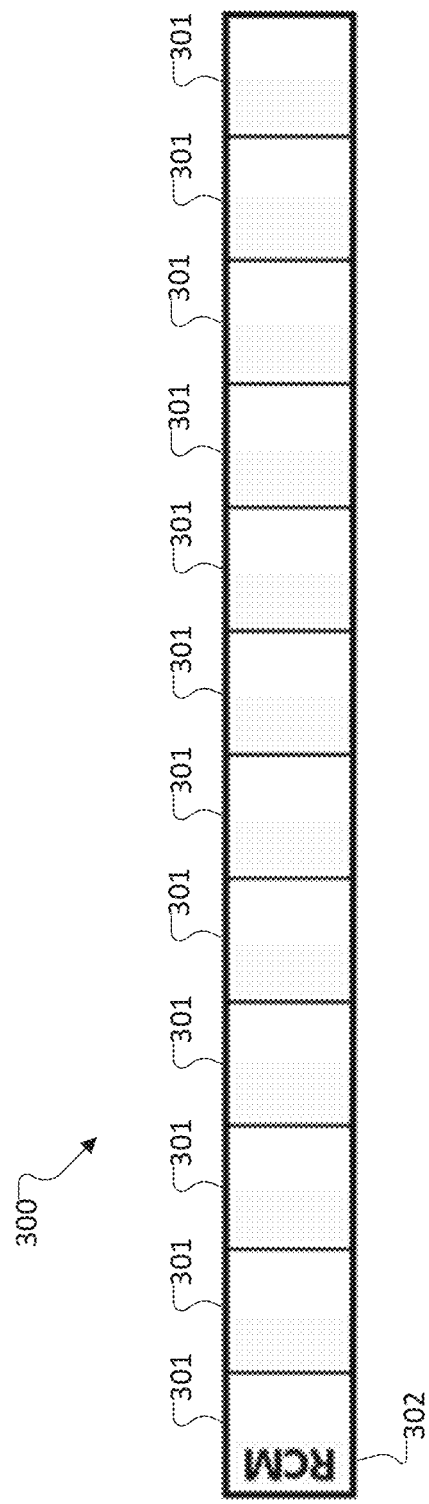
FIGS. 3 and 4 illustrate examples of ranging rounds according to the block-based ranging mode.
Figure 4:
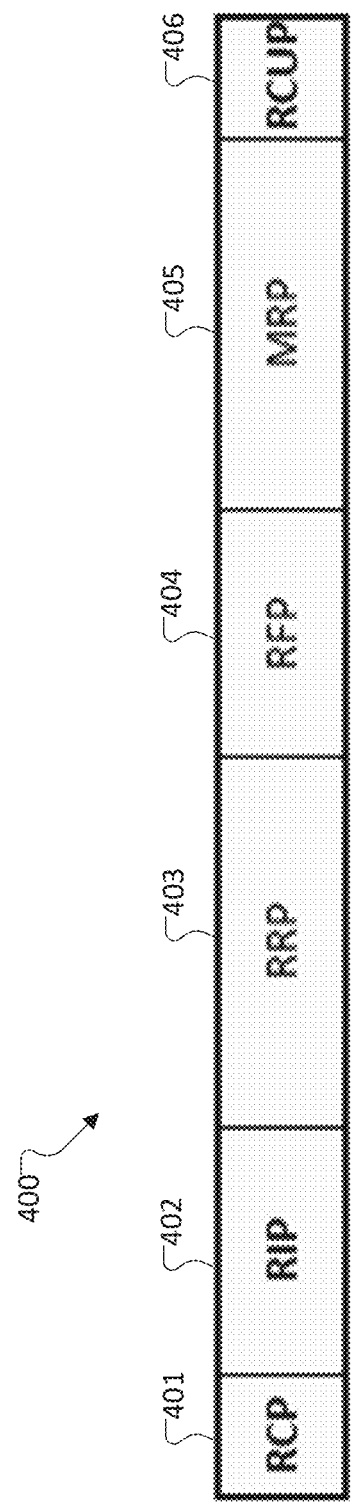

FIGS. 3 and 4 illustrate examples of ranging rounds according to one ranging mode, the block-based mode. The ranging timeline according to the block-based mode operates according to the following timeline as defined in 802.15.14z: ranging blocks contain multiple ranging rounds (back-to-back), where each ranging round further contains multiple ranging slots. For example, FIG. 3 shows a ranging round 300 that includes twelve ranging slots 301. The duration of a ranging slot 301 can be, e.g., 0.5 ms, 1 ms, 2 ms, 5 ms, or the like. Each ranging round 300 starts with a Ranging Control Message (RCM) 302, which contains control information for the current and possible subsequent ranging rounds. As shown in FIG. 4, a ranging round 400 is split into the following phases, in chronological order: Ranging Control Phase (RCP) 401, Ranging Initiation Phase (RIP) 402, Ranging Response Phase (RRP) 403, optional Ranging Final Phase (RFP) 404, optional Measurement Report Phase (MRP) 405, and optional Ranging Control Update Phase (RCUP) 406. In the RCP 401, the controller sends the RCM 302 to the participant devices. In the RIP 402, the initiator sends out initiation ranging. In the RRP 403, responders each perform ranging in response to initiation. In the (optional) RFP 404, the initiator follows up with a second and final ranging. In the (optional) MRP 405, responders communicate measurements (e.g., ToF, AoA, and the like) to the initiator. In the RCUP 406, the controller sends a Ranging Control Update Message (RCUM), which is to update the round structure for the next rounds. The control information that is sent in the RCM 302 and RCUM is enclosed inside Information Elements (IEs) and embedded in the MAC payload.

An active slot is defined as a ranging slot where a device is expected to be active, i.e., actively transmitting or receiving. The following types of ranging slots are considered active slots:

Slots where the RCM and RCUM are transmitted by the controller.
Slots where an initiator performs ranging.
Slots where an initiator performs follow-up ranging.
Slots where the RDEV performs ranging, regardless of whether the RDEV is an initiator or a responder.
Slots where the RDEV sends measurement reports.
Slots containing transmission from any participant, be it ranging or data communication, that the RDEV has an interest in listening to.

The following IEs, among others, determine the location of active slots over the horizon of at least the ranging round in which they are first defined, and potentially for subsequent ranging rounds and ranging blocks as well:

Advanced Ranging Control IE (ARC IE): Carried by the RCM. The ARC IE provides the duration of ranging slots, the number of ranging slots in a ranging round, and the number of ranging rounds in a ranging block. The ARC IE also specifies whether there is a MRP. The ARC IE also determines the number of rounds that control information provided by the RCM is valid for.

Ranging Contention Phase Structure IE (RCPS IE): Carried by the RCM when the ARC IE indicates that contention-based ranging is used. The RCPS IE specifies the start/stop ranging slot delimiters of the RIP, RRP, and MRP.

Ranging Device Management IE (RDM IE): Carried by the RCM. The RDM IE assigns to every participating device a ranging role (e.g., initiator or responder), and allots ranging slots to range or report measurements.

Ranging Round IE (RR IE): Carried by the RCM or the RCUM. The RR IE indicates whether the MAC frame should be transmitted at an offset from the edge of the ranging slot. The RR IE also tracks the index of ranging blocks and rounds.

Ranging Block Update IE (RBU IE): Carried by the RCM or the RCUM to signal whether a new ranging configuration is being used, i.e., to update the sizes of the ranging block, round and slot. The RBU IE also signals the number of remaining blocks with the existing structure before switching to a new structure.

Figure 5:
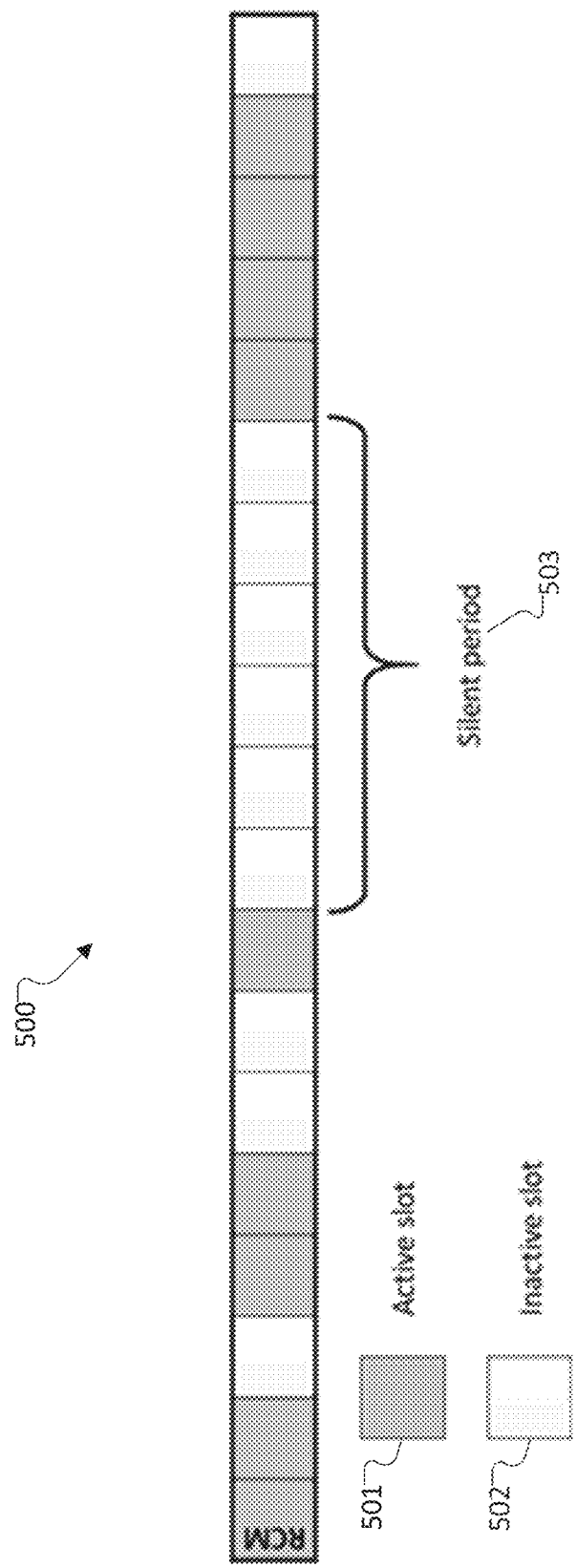
FIG. 5 illustrates an example ranging round that includes active slots, inactive slots, and a silent period.

In addition to the in-band control information sent to the participants by the controller through the RCM and RCUM, out-of-band (OOB) information exchanged by the controller and controlee applications is typically important in determining active slots in any given ranging round. FIG. 5 illustrates an example ranging round 500 that includes active slots 501 (which are ranging slots where the device is expecting to range, measure, or report), inactive slots 502, and a silent period 503, which is a group of contiguous inactive slots 502. The presence of swaths of inactive slots 502 inside ranging rounds and their predetermined location provides a natural environment for coexistence between IEEE 802.11 Wireless Local Area Networks (WLAN) and UWB via time-division-multiplexing (TDM). Given the location and duration of inactive slots 502, WLAN can devise a sleep-wake schedule to align its activity with the idleness of UWB.

Power Management in WLAN

The IEEE 802.11 WLAN standard defines different power management mechanisms to reduce power consumption in WLAN STAs. The very first of those mechanisms, as defined in the original 802.11, allows the STA to inform the AP that is going to sleep or waking up from sleep. The STA can be in one of two power states: Awake, where the STA is turned on and fully powered, and Doze, where the STA is unable to transmit or receive. Further, the STA can operate in two power management modes: Active and Power-Save (PS). In Active mode, the STA is always in the Awake state, where the STA may send and receive frames at any time. In PS mode, the STA can transition back and forth between the Doze state where it is sleeping and the Awake state where it may send data, listen to beacon frames (e.g., from the AP) and poll the AP for buffered data. To transition from one power management mode to another, the STA sends a frame to the AP with the transition information to which the AP responds with an ACK.

There are two mechanisms to go to and wake up from sleep. These two mechanisms are referred to herein as Legacy Power Management. In the first mechanism, the STA goes to sleep by transitioning from Active mode to PS mode where it remains in the Doze state by sending a null frame and setting the PWR MGT bit. The AP acknowledges. The STA wakes up from sleep by transitioning from PS mode back to Active mode by sending a null frame and clearing the PWR MGT bit. The AP acknowledges.

In the second mechanism, the STA goes to sleep by transitioning from the Awake state to the Doze state while in PS mode. The STA wakes up from sleep by transitioning from the Doze state to the Awake state. Unlike in Active mode (where the STA receives fresh data from the AP without having to poll the AP), the STA in the Doze state retrieves data by polling the AP for buffered frames one at a time. Specifically, the STA in PS mode may elect one of two methods for the delivery of its frames buffered at the AP. One method is by using PS Polls. In PS polls, the STA listens to a traffic indicator map (TIM) to determine if the AP has buffered frames for the STA. The STA sends a PS Poll to the AP telling the AP that the STA is awake. The AP sends a buffered frame to the STA. If the frame has the "More Data" bit set, indicating that there are more buffered frames for the STA, the STA will send another PS Poll to get another buffered frame. This is repeated until the AP has no more frames for the STA.

Further amendments to the IEEE 802.11 WLAN standard have introduced other power saving mechanisms (e.g., the QoS-reliant Automatic Power Save Delivery (APSD) in 802.11e) to reduce the overhead of frame retrieval in the legacy method. APSD can be combined efficiently with the above-described legacy power management features to accommodate mixed traffic. The period during which the STA is actively sending or receiving frames is referred to in the 802.11e amendment as the Service Period. To use APSD, a STA submits a Traffic Specification (TSPEC) request with the APSD field set to indicate APSD is to be used (e.g., setting the APSD field to a 1). A TSPEC contains an estimate of the data traffic and associated requirements. All buffered frames associated with an admitted APSD TSPEC are transmitted during a service period.

There are two types of service periods possible under APSD-unscheduled and scheduled-thus leading to two variants of APSD, namely Unscheduled APSD (U-APSD) and Scheduled APSD (S-APSD). The Unscheduled APSD was coined to the more commonly used contention-based medium access control (MAC) technique of 802.11. With U-APSD, the STA enters PS mode where it is able to retrieve all of its buffered frames by polling the AP only once. Unscheduled APSD can be used only with contention-based access, while Scheduled APSD can be used with both contention-based and polled access.

There have been subsequent additions and improvements to power management, e.g. Spatial Multiplexing (SM) Power Save Power Save Multi Poll (PSMP), and BSS Wireless Network Management Max Idle Period and Sleep Mode introduced in the earlier 802.11n and 802.11v amendments, and Target Wake Time (TWT) introduced in the recent 802.11ah amendment.

The remainder of this disclosure will use the terms "asleep" and "sleep" to refer to any state where the WLAN STA cannot actively transmit or receive WLAN frames, and use the terms "awake" and "wake-up" to refer to any state where the STA can actively transmit or receive frames.

Wi-Fi 6E and UWB Channels 5-7 occupy parts of the 6-GHz band. While Wi-Fi and WLAN are used for data applications, UWB (IEEE 802.15.4z) is used for ranging applications, and these two application classes can be operating simultaneously on a device. Significant levels of interference can be seen at the physical layers of WLAN and UWB when both systems are operating simultaneously. Favorable coexistence of these two systems on the same device (i.e., in-device coexistence) is desired to ensure good performance on both fronts: acceptable throughput, latency, among other network-related indicators for WLAN, and acceptable ranging latency for UWB.

To address these and other issues, this disclosure provides a system and method for power saving for in-device coexistence between Wi-Fi and UWB communication in the time domain. As described in more detail below, the disclosed embodiments include a coordinator that determines periods of UWB inactivity to enable WLAN operation therein by using WLAN power saving mechanisms. In some embodiments, the coordinator determines from UWB in-band control information and out-of-band information the ranging timeline of the UWB ranging device (RDEV). Then, the coordinator deduces the silent periods corresponding to UWB inactivity. The coordinator determines a sleep-wakeup schedule for the STA to enable the STA to be awake during periods of UWB inactivity and asleep during periods of UWB activity. Accordingly, the coordinator determines the necessary parameters and time opportunities to convey such a schedule to the AP, and requests that the STA enacts the sleep-wake-up schedule by performing appropriate signaling.

Note that while some of the embodiments discussed below are described in the context of use in consumer electronic devices, such as smartphones or tablet computers, these are merely examples. It will be understood that the principles of this disclosure may be implemented in any number of other suitable devices or contexts.

Figure 6:
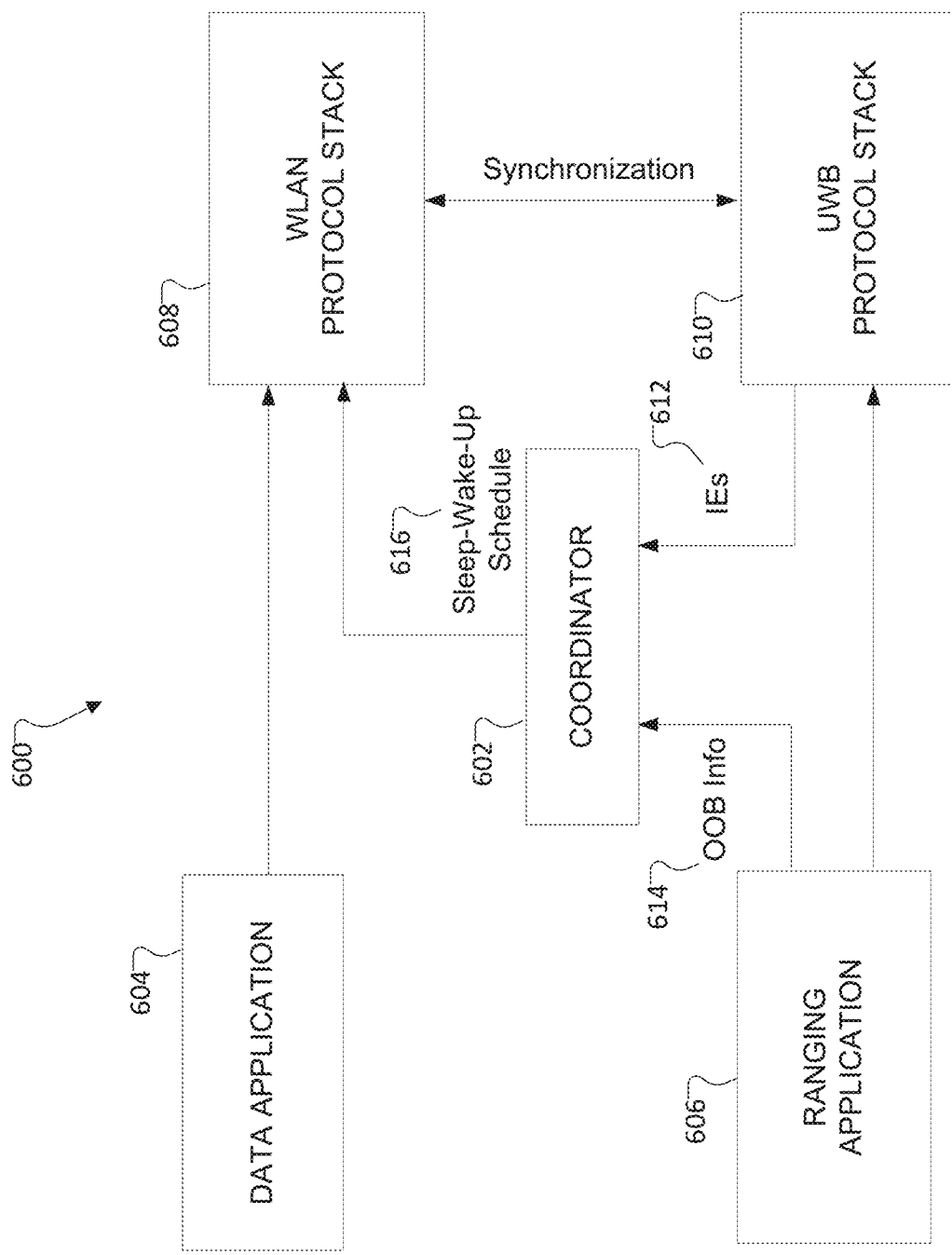
FIG. 6 illustrates an example framework for power saving for in-device coexistence between Wi-Fi and UWB communication in the time domain according to embodiments of the present disclosure.

FIG. 6 illustrates an example framework 600 for power saving for in-device coexistence between Wi-Fi and UWB communication in the time domain according to embodiments of the present disclosure. The embodiment of the framework 600 shown in FIG. 6 is for illustration only. Other embodiments of the framework 600 could be used without departing from the scope of this disclosure. For ease of explanation, the framework 600 will be described as being implemented in the STA 111 of FIG. 1. However, the framework 600 could be implemented in any other suitable device.

As shown in FIG. 6, the framework 600 includes a coordinator 602, a data application 604, and a ranging application 606. The STA 111 can execute both applications 604, 606 simultaneously without affecting performance. The data application 604 uses the WLAN protocol stack 608 of the STA 111, and the ranging application 606 uses the UWB protocol stack 610 of the STA 111. In some embodiments, the data application 604 can include, e.g., a video/voice call, audio streaming, file upload/download, or any real-time or non-real-time data application. The ranging application 606 can be a proximity or positioning application that shows the user navigating indoors (e.g., at a shopping mall, airport, or the like). Of course, these are merely examples, and the data application 604 and the ranging application 606 can represent any suitable applications executing on the STA 111.

The coordinator 602 manages the in-device coexistence of the WLAN communication by the data application 604 and the UWB communication by the ranging application 606 by coordinating their activity. The coordinator 602 could be implemented in the STA 111 as hardware, software, firmware, or any combination of these. In general, WLAN can coexist with UWB on the same device by going active in any of the following time or frequency domains.

(1) Before a ranging event starts (and completing the WLAN transceiving before the ranging event starts) and/or after the ranging event completes (and completing the WLAN transceiving before the next ranging event starts).

(2) Using another WLAN band (e.g., 2.4/5 GHz) that does not overlap in frequency with frequency bands in which UWB operates.

(3) Within a UWB ranging round (e.g., using the inactive slots within the UWB ranging round).

(4) Between ranging rounds, sets of rounds, and ranging blocks when the interval-based mode of ranging is used, as discussed in greater detail below.

In some embodiments, the coordinator 602 coordinates activity between the data application 604 (WLAN) and the ranging application 606 (UWB) within a UWB ranging round. The coordinator 602 can obtain control information to determine a timeline for the ranging session in a future time period. In some embodiments, the coordinator 602 can read the control messages within a ranging round (e.g., the RCM, the RCUM, and the like) and extract relevant control information (e.g., IEs 612) from the UWB protocol stack 610. The control messages can be either generated by the RDEV, if operating as a controller, or received by the RDEV, if operating as a controlee. The coordinator 602 can also obtain OOB information 614 (i.e., other information obtained through a back channel, such as a BLUETOOTH channel) exchanged before the start of the first ranging round. The OOB information 614 can supplement the in-band information (obtained from the RCM and RCUM) in drawing the ranging timeline.

After getting this information, the coordinator 602 deduces all active slots (e.g., the active slots 501), as well as inactive slots (e.g., the inactive slots 502). The coordinator 602 groups the contiguous inactive slots into UWB silent periods (e.g., the silent period 503), with each silent period consisting of a group of contiguous inactive UWB slots. An appropriate length of a silent period useful for WLAN operation, which includes transmission and reception of data frames is around 8-24 msec (although other lengths are possible and within the scope of this disclosure). During UWB silent periods, the coordinator 602 can activate the WLAN transceiver for data transmission and reception. In some embodiments, such a silent period can be long enough at least for WLAN to wake up from sleep and then go back to sleep, according to a determined sleep-wake-up schedule 616. Henceforth in this disclosure, a period of time designated for the WLAN STA's transmission and reception activity is referred to as a Service Period (SP).

Figure 7:
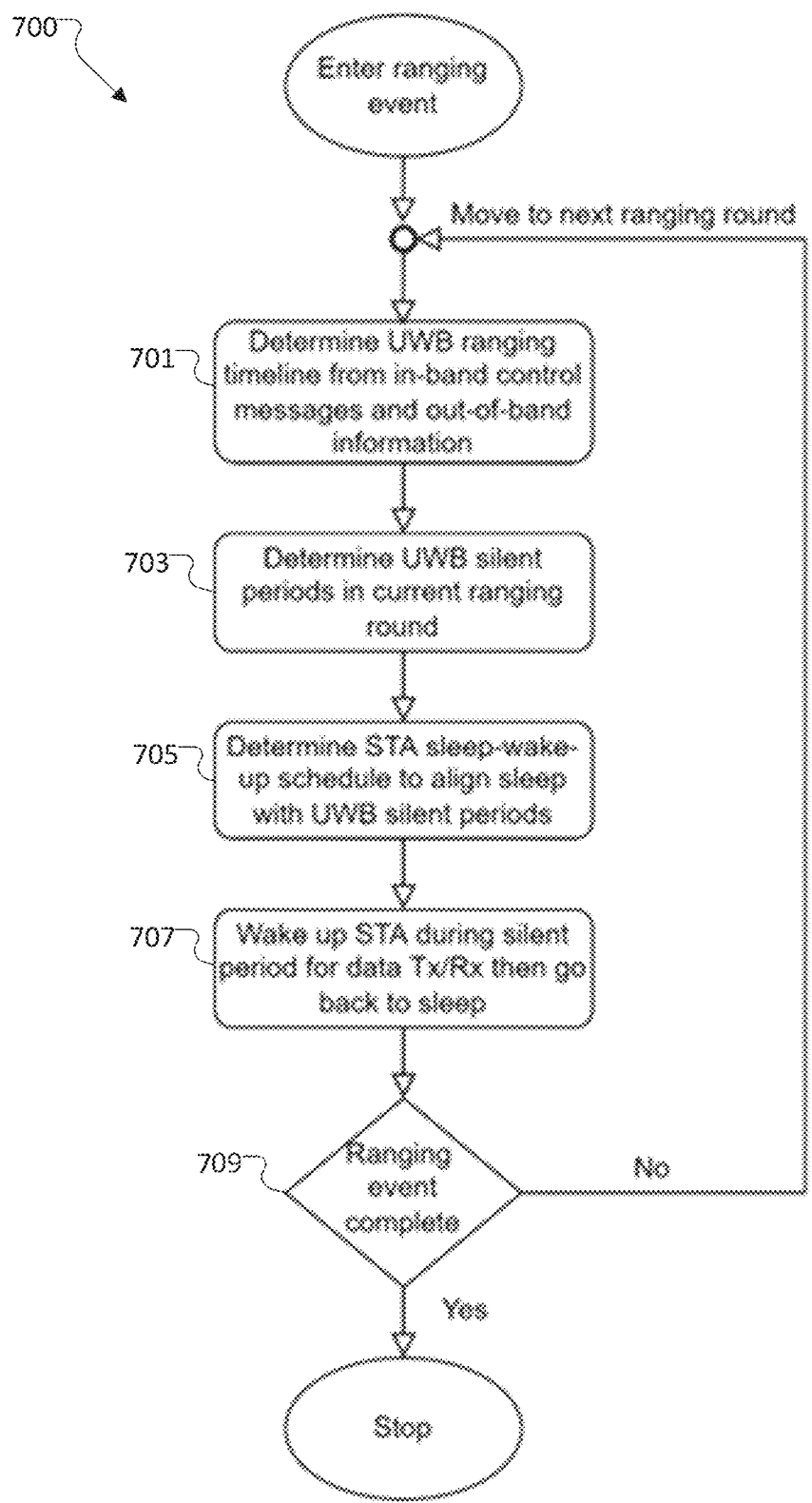
FIGS. 7 and 8 illustrate details of example processes for power saving for in-device coexistence between Wi-Fi and UWB communication in the time domain according to embodiments of the present disclosure.

FIG. 7 illustrates details of an example process 700 for power saving for in-device coexistence between Wi-Fi and UWB communication in the time domain according to embodiments of the present disclosure. For ease of explanation, the process 700 will be described as being performed by the coordinator 602 (as implemented within the STA 111) using the framework 600. The embodiment of the process 700 shown in FIG. 7 is for illustration only. Other embodiments of the process 700 could be used without departing from the scope of this disclosure.

As shown in FIG. 7, at operation 701, the coordinator 602 determines a ranging timeline from the in-band control messages and the GOB information 614. In some embodiments, the coordinator 602 obtains the relevant IEs 612 located inside the RCM, which is present in the first ranging slot of the first ranging round of the first ranging block. This can occur regardless of whether the RDEV assumes the position of the controller (generates control information, e.g., the RCM) or that of the controlee (receives and abides by control information).

The coordinator 602 couples the preceding in-band information with the OOB information 614. In some embodiments, the OOB information 614 can include setup parameters (e.g., number of participants, ranging roles, and the like) that are negotiated between the ranging participants at the app level and communicated, for example, via BLUETOOTH or WiFi. The setup parameters can include any of the parameters carried inside the RCM. Such parameters can be negotiated OOB, and then carried inside the RCM. Alternatively, the parameters can be negotiated GOB, and not carried inside the RCM. Specific examples of 00B information 614 can include device type, device role, multi-node mode, number of controlees, source MAC address, destination MAC address, MAC address mode, ranging method, ranging interval, slots per RR, slot duration, ranging time structure, scheduled mode, UWB initiation time, ranging round hopping, maximum contention phase length, contention phase update length, session priority, maximum number of RR retries, MAC configuration, MAC type, responder slot index, in-band termination attempt count, STS configuration, number of STS segments, vendor ID, static STS IV, STS index, key rotation, key rotation rate, AoA result request, ranging data NTF (near), ranging data NTF (far), blink random interval, authenticity tag, and the like.

The coordinator 602 uses this information to determine, as far into the future as it is able to foresee, the ranging timeline, which involves two components: (i) structure (i.e., the number of ranging blocks per ranging events, rounds per block, slots per round, and the like) and (ii) schedule (i.e., the location of potential ranging slots allotted to every participating device for ranging and data exchange).

At operation 703, the coordinator 602 accounts for all active slots (e.g., the active slots 501) in the current ranging round. The coordinator 602 also deduces inactive slots (e.g., the inactive slots 502) as all ranging slots in the ranging round obtained by extracting out the active slots. The coordinator 602 then examines the pattern of inactive slots in the ranging round and determines the location and duration of one or more silent periods (e.g., the silent period 503) in the ranging round. As discussed above, each silent period comprises a group of contiguous inactive slots.

At operation 705, the coordinator 602 determines a set of silent periods $\{S_i\}$ to be used as SPs, e.g., for WLAN operation. To qualify, a silent period must allow sufficient time for the STA 111 to wake up from sleep at the beginning of the UWB silent period and then go back to sleep toward its end. The time it takes the STA 111 to wake up and go to sleep is specific to the WLAN chipset. An additional guard time can be added to account for the power-management-related signaling between the AP and the STA.

At operation 707, the coordinator 602 wakes up the STA 111 at the beginning of every qualified UWB silent period and then puts the STA 111 back to sleep at the end of the period according to a determined sleep-wake-up schedule 616. The coordinator 602 also reads the RCUM at the end of the current ranging round (if available) and the RCM at the start of the following ranging round, extracts relevant IEs, and updates the ranging structure if needed. Based on the ranging structure, the coordinator 602 determines or updates the set of silent periods.

At operation 709, the coordinator 602 determines if the ranging event is complete. If the ranging event is not complete, then the coordinator 602 moves to the next ranging round and repeats the sequence of action until the ranging event completes.

Although FIG. 7 illustrates one example of a process 700 for power saving for in-device coexistence between Wi-Fi and UWB communication in the time domain, various changes may be made to FIG. 7. For example, while shown as a series of steps, various steps in FIG. 7 could overlap, occur in parallel, occur in a different order, or occur any number of times.

Figure 8:
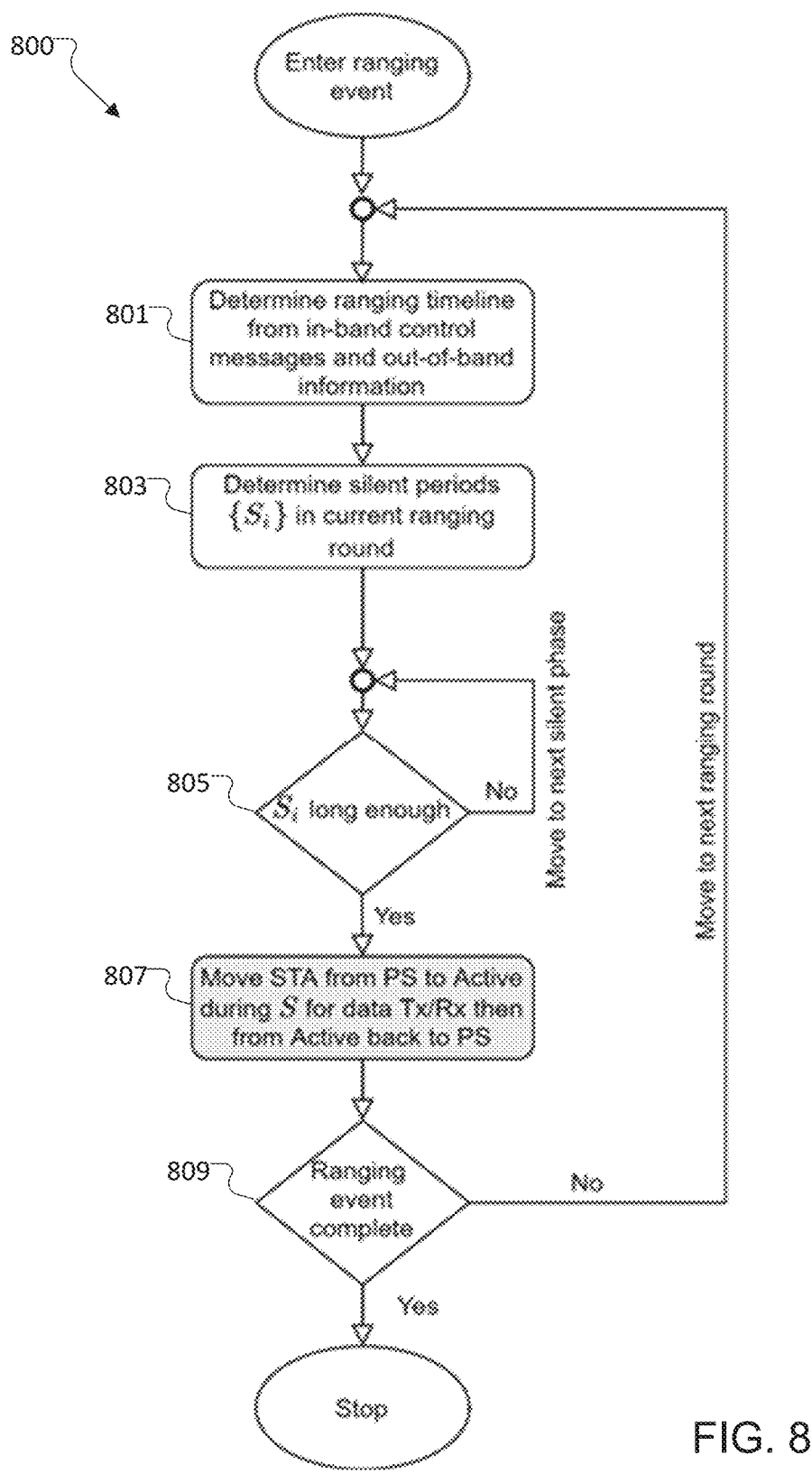

FIG. 8 illustrates details of another example process 800 for power saving for in-device coexistence between Wi-Fi and UWB communication in the time domain according to embodiments of the present disclosure. In some embodiments, the process 800 is a more detailed version of the process 700 of FIG. 7, and the process 800 includes multiple operations that are the same as (or similar to) corresponding operations of the process 700. For ease of explanation, the process 800 will be described as being performed by the coordinator 602 using the framework 600. The embodiment of the process 800 shown in FIG. 8 is for illustration only. Other embodiments of the process 800 could be used without departing from the scope of this disclosure.

As shown in FIG. 8, the process 800 is performed in ranging rounds. In some embodiments, prior to the start of the UWB ranging event, the coordinator 602 sends the STA 111 into PS mode. The coordinator 602 can further set the beacon listen interval to exceed the duration of the UWB ranging event if known via OOB exchange.

At operation 801, the coordinator 602 determines a ranging timeline from the in-band control messages and the OOB information 614. In some embodiments, the coordinator 602 reads the RCM of the first ranging slot of the first ranging round of the first ranging block, in order to extract one or more IEs 612. For example, the coordinator 602 can obtain the first ARC IE 612 and read the Ranging Block Duration, Ranging Round Duration, and Ranging Slot Duration fields of the ARC IE ($N_{RB}$, $N_{RR}$ and $N_{RS}$) to determine the block structure. The coordinator 602 can also read the Deferred Mode field of the ARC IE 612 to determine whether a dedicated MRP exists in the ranging round after the ranging cycle completes. This information can be used in conjunction with other information to mark out ranging slots that can be used for ranging and measurement reporting.

The coordinator 602 can also read the Ranging Round Usage field of the ARC IE 612 to determine the time-based technique used for ranging (e.g., single-sided two-way ranging) and determine the number of ranging messages to be sent out by every initiator and responder. This information can also be used in conjunction with other information to mark out ranging slots that can be used for ranging and measurement reporting. The coordinator 602 can also read the Schedule Mode field of the ARC IE 612 to determine whether schedule-based ranging or contention-based ranging is used. In schedule-based ranging, RDEVs are assigned ranging slots where they can access the channel to range or communicate ranging information. In contention-based ranging, RDEVs are given a range of ranging slots where they can contend for the channel to range or communicate ranging information. Any or all of this information can be used in conjunction with other information (e.g., the Ranging Round Usage field and/or the Deferred Mode field in the ARC IE 612) to mark out ranging slots that will be used for ranging and measurement reporting.

In addition to the obtaining the ARC IE, the coordinator 602 can also obtain the RDM IE 612 and determines the role of every participating device, i.e., initiator or responder. If schedule-based ranging is used by the controller, the coordinator 602 also determines every ranging slot that is assigned to every initiator or responder. If contention-based ranging is used by the controller, the coordinator 602 also obtains the RCPS IE 612 and determines the start/stop ranging slot delimiters of different contention phases that the controller allocates for initiators to range, responders to range, and responders to report measurements.

The coordinator 602 can also read other IEs 612 (if needed) and couple the information therein with OOB information 614 (i.e., other information obtained or negotiated at the app level) to determine the location of potential ranging slots marked for ranging initiation messages, ranging response messages, ranging final messages, measurement report messages, and the like. As previously noted, a preliminary "negotiation" phase precedes ranging, where the controller determines the ranging parameters that work with all participants. These parameters may be sent out again in-band through the RCM or other control messages.

At operation 803, the coordinator 602 accounts for all active slots (e.g., the active slots 501) in the current ranging round. If this device is a responder, then the active slots are the slots in which, in chronological order, the RCM is sent out by the controller, a ranging initiation message is sent out by an initiator, a ranging response message is sent out by the ranging device in consideration, a ranging final message is sent out by an initiator (when valid), a measurement report message is sent out by the ranging device in question (when valid), and the RCUM is sent out by the controller (when available). Alternatively, if the device is an initiator, then the active slots are the slots where, in chronological order, the RCM is sent out by the controller, a ranging initiation message is sent by itself, a ranging response message is sent by a responder, a ranging final message is sent by itself, a measurement report message is sent by a responder (when valid), and the RCUM is sent out by the controller (when available). Alternatively, if the device is neither an initiator nor a responder, but rather an eavesdropper, then the active slots are the slots in which, in chronological order, the RCM is sent out by the controller, a ranging initiation message is sent out by an initiator, a ranging response is sent out by a responder, a ranging final message is sent out by an initiator (when valid), a measurement report message is sent by a responder (when valid), and the RCUM is sent out by the controller (when available).

The coordinator 602 also deduces inactive slots (e.g., the inactive slots 502) as all ranging slots in the ranging round obtained by extracting out the active slots. The coordinator 602 then examines the pattern of inactive slots in the ranging round and determines the location and duration of one or more silent periods $\{S_i\}$. In some embodiments, the coordinator 602 computes the duration of every silent period $S_i$ according to the following:

$$S_i = N_{S,i} \cdot T_{RSTU},$$

where $N_{S,i}$ is the number of ranging slots in the silent period i and $T_{RSTU}$ is the duration of the Ranging Time Slot Unit (RSTU), which is defined by the 802.15.4z standard as 833.33 ns for the high-rate physical layer and 1 µs for the low-rate physical layer.

The coordinator 602 also determines $N_{VRR}$, which is the RCM Validity Rounds field of the ARC IE 612. The value of $N_{VRR}$ defines the number of consecutive ranging rounds controlled by the RCM. The silent periods $\{S_i\}$ in each of the ranging rounds 0 . . . $N_{VRR}$–1 are identical.

At operation 805, the coordinator 602 determines the SPs by filtering the set of silent periods $\{S_i\}$ based on certain criteria. For example, the coordinator 602 can examine each silent period $S_i$ and determine if each silent period $S_i$ is long enough to allow the STA to wake up (at the beginning of the silent period) and then go back to sleep (at the end of the silent period). In some embodiments, there are multiple other criteria for making this selection. The coordinator 602 can choose a particular silent period $S_i$ that has a better match with the traffic pattern, assuming that the silent period is long enough to accommodate the traffic. The coordinator 602 can identify traffic patterns by collecting statistics on packet inter-arrival times and burst periods, for example. Alternatively, the coordinator 602 can request such information from a logically independent entity whose purpose is detecting traffic patterns for a particular app (e.g., the foreground app) or for a superposition of traffic for the most actively used apps by the user.

At operation 807, the coordinator 602 wakes up the STA at the beginning of every qualified silent period $S_i$ designated by the coordinator 602 as a SP and then puts the STA back to sleep at the end of the period. With legacy power management, the coordinator 602 evaluates any power constraints or throughput targets to be used as guides to use one of the following two mechanisms, which are illustrated in the ranging timeline 900 of FIG. 9.

Figure 9:
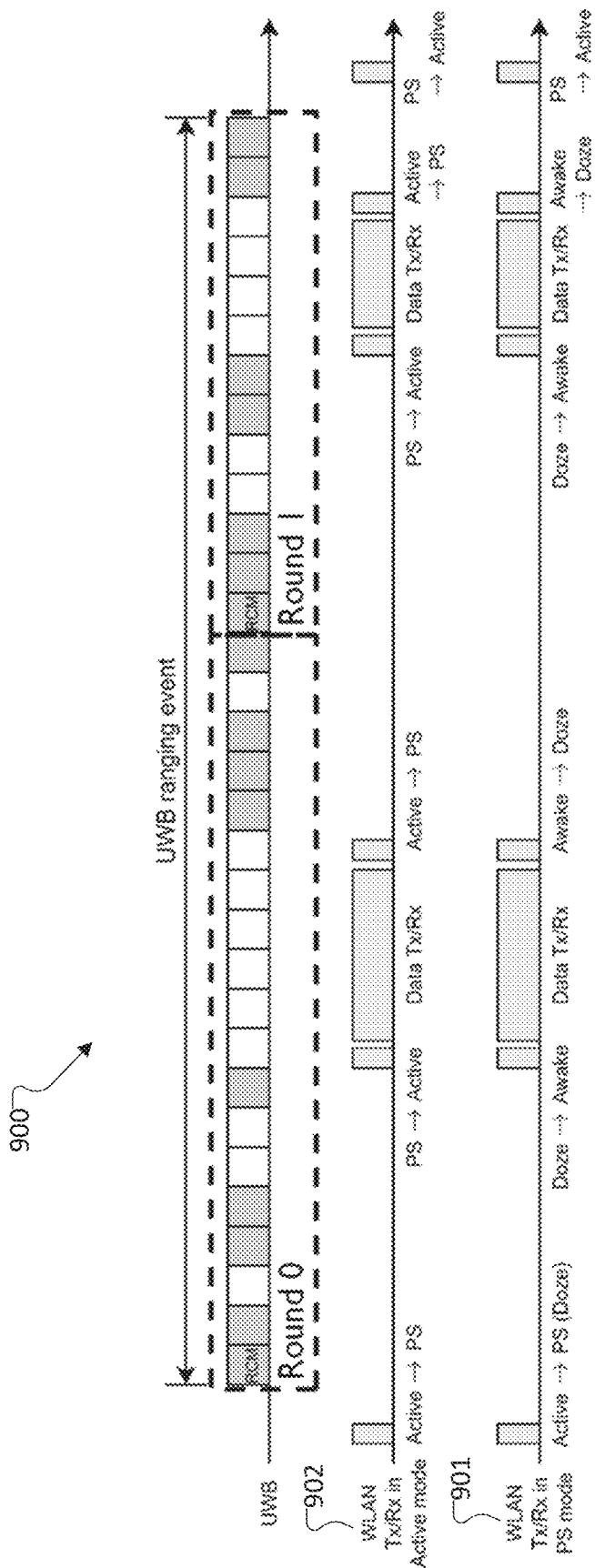
FIG. 9 illustrates an example ranging timeline in which the sleep-wake-up mechanisms within legacy power management are used to match WLAN service periods with UWB silent periods according to embodiments of the present disclosure.

As shown in FIG. 9, the sleep-wake-up mechanisms within legacy power management are used to match WLAN service periods with UWB silent periods according to embodiments of the present disclosure. In one mechanism 901, the STA remains in PS mode. To wake up, the STA transitions from the Doze state to the Awake state. In the Awake state, the STA can listen to beacon frames, send data, and poll the AP to retrieve buffered data during a data communication period (Data Tx/Rx). To go back to sleep, the STA transitions from the Awake state to the Doze state.

In another mechanism 902, the STA transitions from PS mode to Active mode, where the STA can listen to beacons, send data, and receive fresh data (that has not been buffered) during a data communication period (Data Tx/Rx), without having to poll the AP. The STA then transitions from the Active mode back to the PS mode.

At operation 809, the coordinator 602 determines if the ranging event is complete. If the ranging event is not complete, then the coordinator 602 moves to the next ranging round and repeats the sequence of action until the ranging event completes. The coordinator 602 reads the RCUM at the end of the current ranging round, if available, and the RCM at the start of the following ranging round, extracts relevant IEs, and updates the ranging structure if needed, and accordingly the set of silent periods.

In subsequent cycles, the coordinator 602 reads the RR IE in the RCM or RCUM. The RR IE indicates if frames are transmitted at an offset from the starting edge of the ranging slot. The coordinator 602 uses this information to adjust the starting point of the SP and its duration. The RR IE also indicates if round hopping is used where the controller hops to a different round, i.e., moves the ranging cycle from ranging round i in ranging block n to round j in block n+1, i≠j. The coordinator 602 obtains the hopping schedule through GOB means.

Although FIG. 8 illustrates one example of a process 800 for power saving for in-device coexistence between Wi-Fi and UWB communication in the time domain, various changes may be made to FIG. 8. For example, while shown as a series of steps, various steps in FIG. 8 could overlap, occur in parallel, occur in a different order, or occur any number of times.

Figure 10:
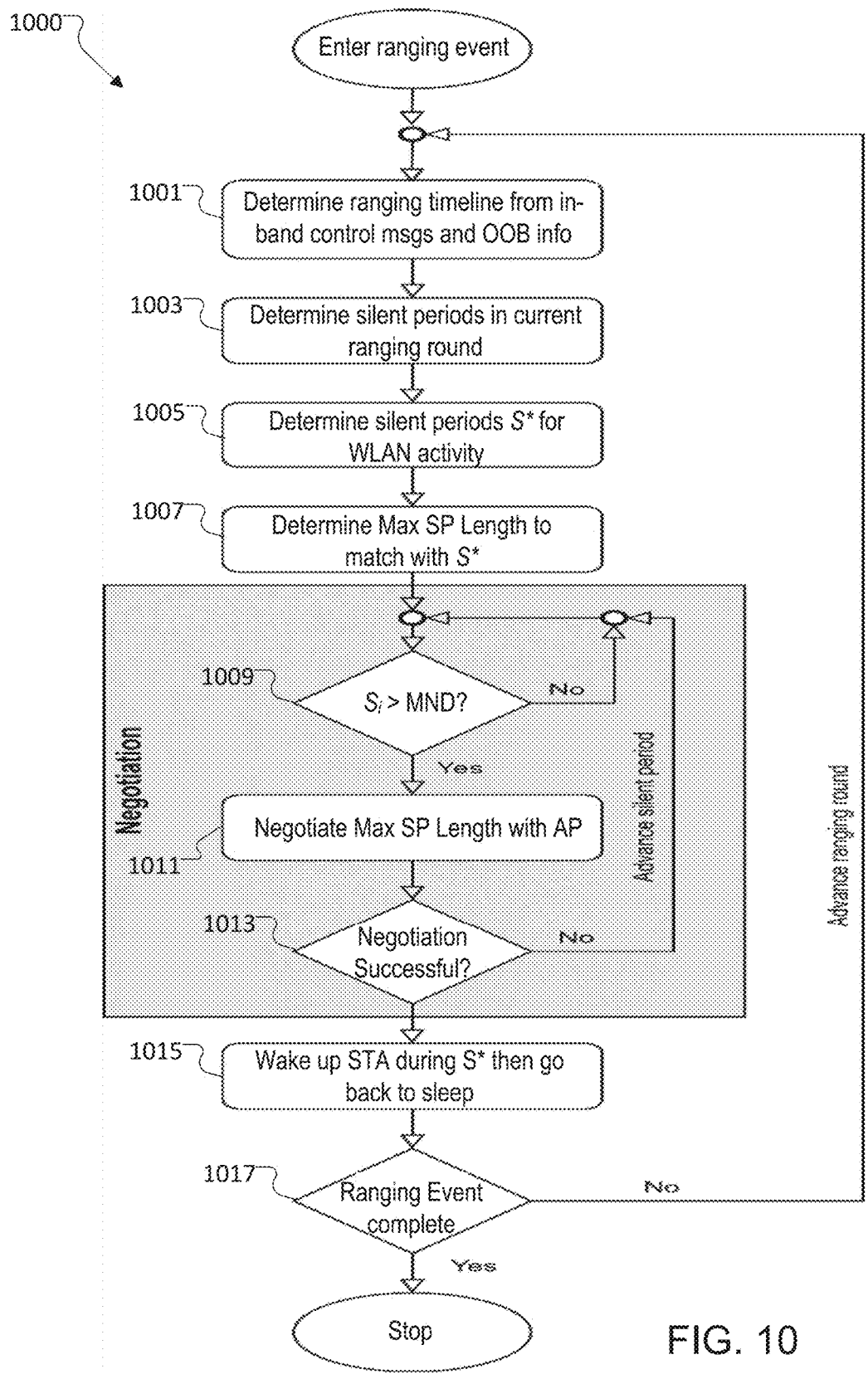
FIG. 10 illustrates details of another example process for power saving for in-device coexistence between Wi-Fi and UWB communication in the time domain according to embodiments of the present disclosure.
Figure 11:
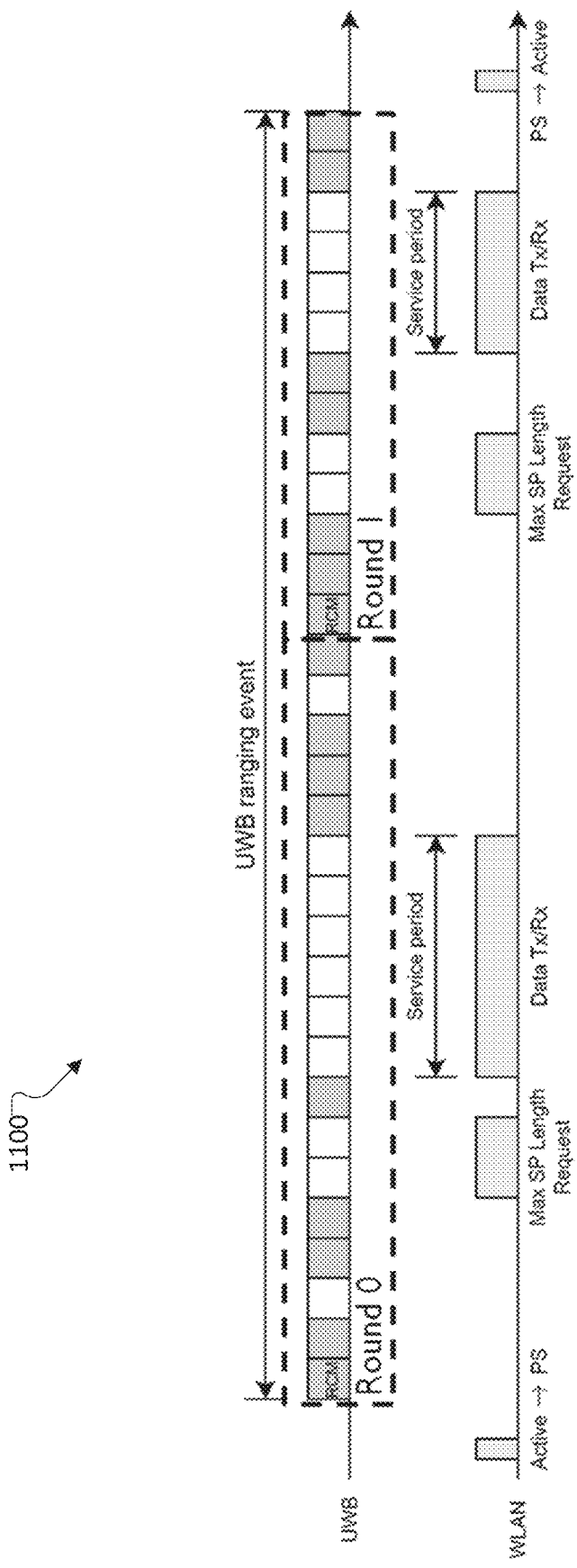
FIG. 11 illustrates an example ranging timeline in which the WLAN service period is both activated and negotiated during the UWB silent period according to embodiments of the present disclosure.

FIG. 10 illustrates details of another example process 1000 for power saving for in-device coexistence between Wi-Fi and UWB communication in the time domain according to embodiments of the present disclosure. For ease of explanation, the process 1000 will be described as being performed by the coordinator 602 using the framework 600. The process 1000 includes multiple operations that are the same as (or similar to) corresponding operations of the process 800 of FIG. 8. However, as discussed below, the process 1000 is used with U-APSD. Also, instead of waking up the STA during every qualified silent period, the coordinator 602 selects one silent period. The embodiment of the process 1000 shown in FIG. 10 is for illustration only. Other embodiments of the process 1000 could be used without departing from the scope of this disclosure.

As shown in FIG. 10, the process 1000 is performed in ranging rounds. In some embodiments, prior to the start of the UWB ranging event, the coordinator 602 sends the STA 111 into PS mode. The coordinator 602 can further set the beacon listen interval to exceed the duration of the UWB ranging event if known via OOB exchange.

At operation 1001, the coordinator 602 determines a ranging timeline from the in-band control messages and the OOB information 614. This can be the same as or similar to the operation 801 of FIG. 8. In some embodiments, the coordinator 602 reads the RCM of the first ranging slot of the first ranging round of the first ranging block, in order to extract one or more IEs 612. For example, the coordinator 602 can obtain the first ARC IE 612, the RDM IE 612, the RCPS IE 612, and/or other IEs 612 and extract information that can be used in conjunction with other information to mark out ranging slots that can be used for ranging and measurement reporting.

At operation 1003, the coordinator 602 accounts for all active slots (e.g., the active slots 501) in the current ranging round. The coordinator 602 also deduces inactive slots (e.g., the inactive slots 502) as all ranging slots in the ranging round obtained by extracting out the active slots. The coordinator 602 then examines the pattern of inactive slots in the ranging round and determines the location and duration of one or more silent periods $\{S_i\}$. This can be the same as or similar to the operation 803 of FIG. 8.

At operation 1005, the coordinator 602 determines the duration of the silent periods dedicated for WLAN activity. The coordinator 602 designates one or more of the silent periods as the Service Period (SP) as per 802.11e, i.e., the period during which the STA can send/retrieve frames.

At operation 1007, the coordinator 602 obtains the parameter Max SP Length, which is a field in WLAN management frames that indicates the number of buffered frames to be delivered in an SP.

In operations 1009-1013, the coordinator 602 requests that the STA negotiate with the AP the size of the SP. As described below, the negotiation is performed using an U-APSD mechanism, and the SP size is expressed as a maximum SP duration according to Max SP Length. As the parameter Max SP Length represents a number of frames rather than a duration to communicate the frames, the coordinator 602 converts the duration of the silent period into a number of frames by predicting the frame data rate from recent history. The negotiation can start with the STA sending a re-association request to the AP with the Max SP Length field set appropriately. The AP acknowledges the size of the SP by sending a re-association response confirming the value of the Max SP Length field.

The coordinator 602 determines silent periods suitable for negotiating the Max SP Length with the AP. The coordinator 602 allows negotiation to happen in any silent period leading up to the SP. The coordinator 602 requests that the STA negotiate the Max SP Length with the AP in the earliest silent period as long as its duration exceeds the Minimum Negotiation Duration (MND). The MND takes into account the time it takes the STA to wake up from sleep and the time it takes to negotiate with the AP. The wakeup time is bounded and specific to the WLAN chipset, and it is in the range of tens of microseconds. The negotiation time, however, depends on the level of network congestion and can range from a few hundreds of microseconds to a few milliseconds. Accordingly, the coordinator 602 can either assume a worst-case congestion, prompt user input, or infer the level of congestion by communicating with other logically-independent entities running on the device tasked with inferring network congestion information.

At operation 1013, it is determined if negotiation is successful. If the negotiation fails in the earliest silent period, the STA tries the next silent period. If negotiation defers to the silent period matching the SP, then the STA reverts to Legacy power management to wake up at the start of the silent period and then go back to sleep at the end.

The STA operates in Power Save mode for the entire duration of the UWB ranging event. At operation 1015, at the beginning of the SP, the STA sends a "trigger frame" to the AP to indicate that it is awake, marking the start of the SP. During the SP, the STA, having moved from the Doze state to the Awake state, can send frames to the AP if it has any, and the AP will send buffered frames to the STA up to the number specified by the Max SP Length parameter. The AP signals to the STA the end of the SP as it sends the last buffered frame of the SP. This is illustrated in the ranging timeline 1100 of FIG. 11. As shown in the ranging timeline 1100, the WLAN service period is both activated and negotiated during the UWB silent period.

At operation 1017, the coordinator 602 determines if the ranging event is complete. If the ranging event is not complete, then the coordinator 602 moves to the next ranging round and repeats the sequence of action until the ranging event completes.

Although FIG. 10 illustrates one example of a process 1000 for power saving for in-device coexistence between Wi-Fi and UWB communication in the time domain, various changes may be made to FIG. 10. For example, while shown as a series of steps, various steps in FIG. 10 could overlap, occur in parallel, occur in a different order, or occur any number of times.

Figure 12:
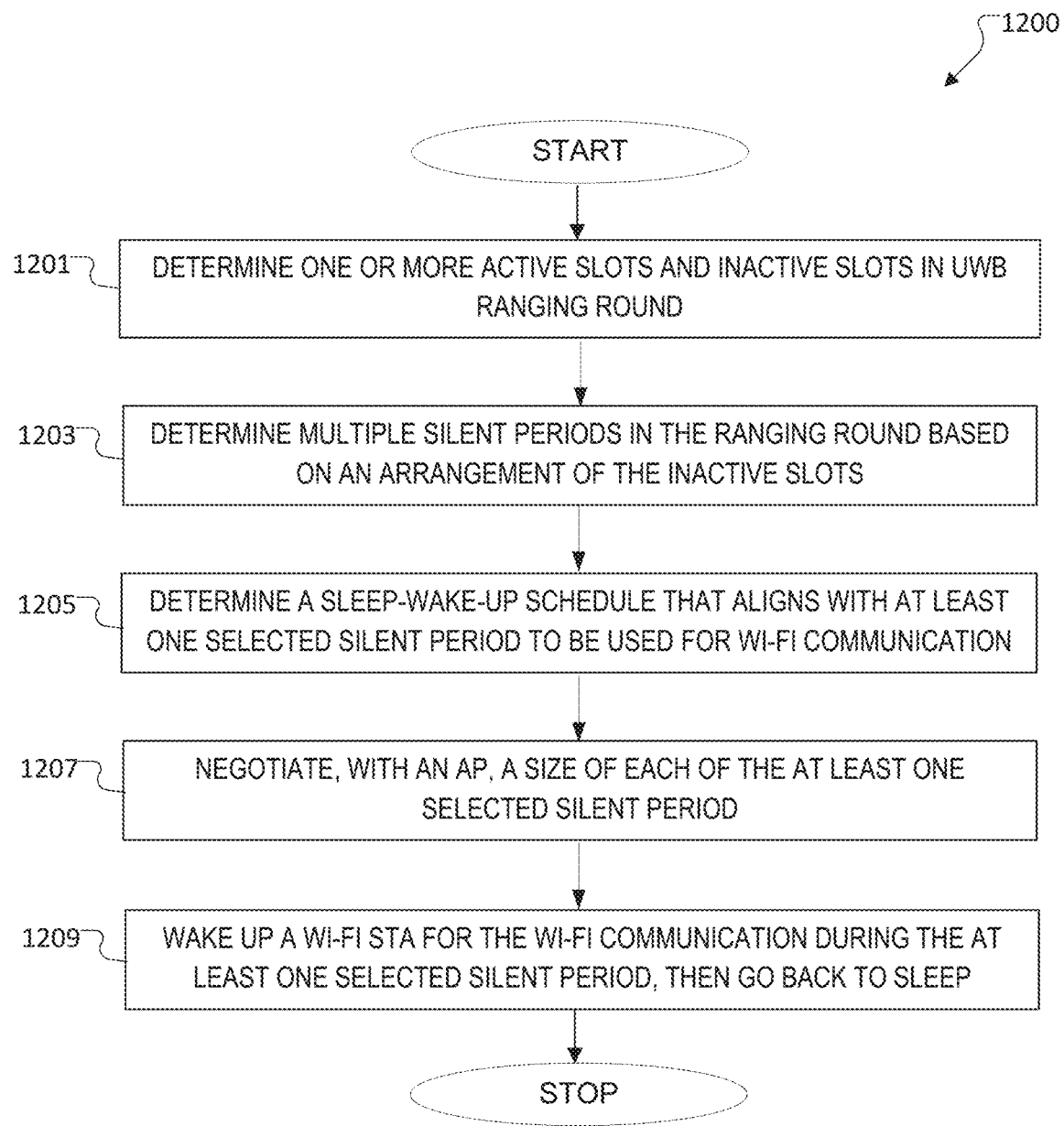
FIG. 12 illustrates a flow chart of a method for power saving for in-device coexistence between Wi-Fi and ultra-wide band communication in the time domain according to embodiments of the present disclosure.

FIG. 12 illustrates a flow chart of a method 1200 for power saving for in-device coexistence between Wi-Fi and ultra-wide band communication in the time domain according to embodiments of the present disclosure, as may be performed by a STA executing a coordinator (e.g., the coordinator 602 as illustrated in FIG. 6). The embodiment of the method 1200 shown in FIG. 12 is for illustration only. One or more of the components illustrated in FIG. 12 can be implemented in specialized circuitry configured to perform the noted functions, or one or more of the components can be implemented by one or more processors executing instructions to perform the noted functions.

As illustrated in FIG. 12, the method 1200 begins at step 1201. At step 1201, a STA determines one or more active slots and inactive slots in a UWB ranging round. This could include, for example, the STA 111 executing the coordinator 602 to determine one or more active slots 501 and inactive slots 502 in an UWB ranging round 500, such as described in operation 701, operation 801, and operation 1001.

At step 1203, the STA determines multiple silent periods in the ranging round based on an arrangement of the inactive slots. This could include, for example, the STA 111 executing the coordinator 602 to determine multiple silent periods 503 in the UWB ranging round 500 based on the arrangement of the inactive slots 502, such as described in operation 703, operation 803, and operation 1003.

At step 1205, the STA determines a sleep-wake-up schedule that aligns with at least one selected silent period of the multiple UWB silent periods in the ranging round, where the sleep-wake-up schedule is to be used for Wi-Fi communication. This could include, for example, the STA 111 executing the coordinator 602 to determine a sleep-wake-up schedule 616 in the ranging round 500, such as described in operation 705, operation 805, and operations 1005-1013.

At step 1207, the STA optionally negotiates with an AP a size of each of the at least one selected silent period to enact the sleep-wake-up schedule. In some embodiments, the negotiating is performed using an U-APSD mechanism, and the size is expressed as a maximum SP duration. This could include, for example, the STA 111 negotiating with the AP 101, such as described in operations 1009-1013.

At step 1209, the STA wakes up for the Wi-Fi communication during the at least one selected silent period, then goes back to sleep according to the sleep-wake-up schedule. This could include, for example, the STA 111 performing Wi-Fi communication during the at least one selected silent period, such as described in operation 707, operation 807, and operation 1015.

Although FIG. 12 illustrates one example of a method 1200 for power saving for in-device coexistence between Wi-Fi and UWB communication in the time domain, various changes may be made to FIG. 12. For example, while shown as a series of steps, various steps in FIG. 12 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   determining one or more active slots and inactive slots in an ultra-wide band (UWB) ranging round;
   determining multiple UWB silent periods in the ranging round based on an arrangement of the inactive slots by (i) determining multiple sets of contiguous inactive slots in the UWB ranging round and (ii) grouping each set of contiguous inactive slots into one of the multiple UWB silent periods;
   determining a sleep-wake-up schedule that aligns with at least one selected silent period of the multiple UWB silent periods in the ranging round, the sleep-wake-up schedule to be used for Wi-Fi communication; and
   waking up a Wi-Fi station (STA) for the Wi-Fi communication during the at least one selected silent period, then going back to sleep according to the sleep-wake-up schedule.

2. The method of claim 1, further comprising:
   negotiating, with an access point (AP), a size of each of the at least one selected silent period to enact the sleep-wake-up schedule.

3. The method of claim 2, wherein the negotiating is performed using an Unscheduled Automatic Power Save Delivery (U-APSD) mechanism, and wherein the size is expressed as a maximum service period (SP) duration.

4. The method of claim 1, wherein determining the sleep-wake-up schedule that aligns with the at least one selected silent period comprises:
   selecting the at least one selected silent period in response to determining that the at least one selected silent period is sufficiently long to allow the STA to wake up for the Wi-Fi communication and then go back to sleep during the at least one selected silent period.

5. The method of claim 1, wherein the sleep-wake-up schedule comprises time periods, during the at least one selected silent period, for at least one of:
   a transition from a power save mode to an active mode, a data communication period, and a transition from the active mode to the power save mode; and
   a transition from a doze state to an awake state, a data communication period, and a transition from the awake state to the doze state.

6. The method of claim 1, wherein the one or more active slots and inactive slots are determined based on out-of-band (OOB) information and one or more information elements (IEs) within one or more UWB control messages of the ranging round.

7. The method of claim 6, wherein:
   the one or more UWB control messages of the ranging round comprise a ranging control message (RCM), and the one or more IEs comprise at least one of: an Advanced Ranging Control IE, a Ranging Contention Phase Structure IE, a Ranging Device Management IE, a Ranging Round IE, and a Ranging Block Update IE.

8. A device comprising:
   a transceiver; and
   a processor operably connected to the transceiver, the processor configured to:
   determine one or more active slots and inactive slots in an ultra-wide band (UWB) ranging round;
   determine multiple UWB silent periods in the ranging round based on an arrangement of the inactive slots by (i) determining multiple sets of contiguous inactive slots in the UWB ranging round and (ii) grouping each set of contiguous inactive slots into one of the multiple UWB silent periods;
   determine a sleep-wake-up schedule that aligns with at least one selected silent period of the multiple UWB silent periods in the ranging round, the sleep-wake-up schedule to be used for Wi-Fi communication; and
   control the device to wake up for the Wi-Fi communication during the at least one selected silent period, then go back to sleep according to the sleep-wake-up schedule.

9. The device of claim 8, wherein the processor is further configured to:
   negotiate, with an access point (AP), a size of each of the at least one selected silent period to enact the sleep-wake-up schedule.

10. The device of claim 9, wherein the processor is configured to negotiate the size using an Unscheduled Automatic Power Save Delivery (U-APSD) mechanism, and wherein the size is expressed as a maximum service period (SP) duration.

11. The device of claim 8, wherein to determine the sleep-wake-up schedule that aligns with the at least one selected silent period, the processor is configured to:
   select the at least one selected silent period in response to determining that the at least one selected silent period is sufficiently long to allow the device to wake up for the Wi-Fi communication and then go back to sleep during the at least one selected silent period.

12. The device of claim 8, wherein the sleep-wake-up schedule comprises time periods, during the at least one selected silent period, for at least one of:
   a transition from a power save mode to an active mode, a data communication period, and a transition from the active mode to the power save mode; and
   a transition from a doze state to an awake state, a data communication period, and a transition from the awake state to the doze state.

13. The device of claim 8, wherein the one or more active slots and inactive slots are determined based on out-of-band (OOB) information and one or more information elements (IEs) within one or more UWB control messages of the ranging round.

14. The device of claim 13, wherein:
   the one or more UWB control messages of the ranging round comprise a ranging control message (RCM), and the one or more IEs comprise at least one of: an Advanced Ranging Control IE, a Ranging Contention Phase Structure IE, a Ranging Device Management IE, a Ranging Round IE, and a Ranging Block Update IE.

15. A non-transitory computer readable medium comprising a plurality of instructions that, when executed by at least one processor, is configured to cause the at least one processor to:

- determine one or more active slots and inactive slots in an ultra-wide band (UWB) ranging round;
- determine multiple UWB silent periods in the ranging round based on an arrangement of the inactive slots by (i) determining multiple sets of contiguous inactive slots in the UWB ranging round and (ii) grouping each set of contiguous inactive slots into one of the multiple UWB silent periods;
- determine a sleep-wake-up schedule that aligns with at least one selected silent period of the multiple UWB silent periods in the ranging round, the sleep-wake-up schedule to be used for Wi-Fi communication; and
- control a Wi-Fi station (STA) to wake up for the Wi-Fi communication during the at least one selected silent period, then go back to sleep according to the sleep-wake-up schedule.

16. The non-transitory computer readable medium of claim 15, wherein the plurality of instructions is further configured to cause the at least one processor to:
- negotiate, with an access point (AP), a size of each of the at least one selected silent period to enact the sleep-wake-up schedule.

17. The non-transitory computer readable medium of claim 16, wherein the negotiating is performed using an Unscheduled Automatic Power Save Delivery (U-APSD) mechanism, and wherein the size is expressed as a maximum service period (SP) duration.

18. The non-transitory computer readable medium of claim 15, wherein to determine the sleep-wake-up schedule that aligns with the at least one selected silent period, the plurality of instructions is configured to cause the at least one processor to:
- selecting the at least one selected silent period in response to determining that the at least one selected silent period is sufficiently long to allow the STA to wake up for the Wi-Fi communication and then go back to sleep during the at least one selected silent period.

* * * * *